Patented June 14, 1938

2,120,573

UNITED STATES PATENT OFFICE 2,120,573

ACID WOOL DYESTUFFS

Heinrich Ritter, Frankfort-on-the-Main-Fechenheim, Germany, assignor to General Aniline Works, Inc., New York, N. Y., a corporation of Delaware No Drawing. Application August 17, 1937, Serial No. 159,525. In Germany August 25, 1936

2 Claims. (Cl. 260—99.30)

This invention relates to valuable new acid wool dyestuffs, more particularly to those of the general formula:

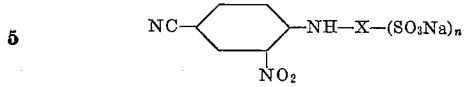

wherein $n$ stands for the number 1 or 2 and X stands for a member selected from the group consisting of aryl-NH-aryl and cycloalkyl-NH-aryl, aryl meaning a radicle selected from the group consisting of the benzene and naphthalene series.

The new dyestuffs are obtained by condensing nitro compounds of the general formula:

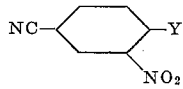

wherein Y stands for a member selected from the group consisting of halogen and alkoxy, with compounds of the general formula:

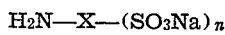

$$H_2N-X-(SO_3Na)_n$$

wherein X and $n$ have the above signification.

The condensation may be carried out by heating the initial materials in the presence of acid-binding agents such as for example sodium acetate, calcium hydroxide, calcium carbonate and the like in an aqueous medium or in an organic diluent with or without the simultaneous addition of water either in an open vessel provided with a reflux condenser or in a closed vessel under pressure.

The new dyestuffs thus obtained dye animal fibers various shades of very good levelling power and excellent fastness to light.

In order to further illustrate my invention the following example is given, the parts being by weight; but it is, however, to be understood that my invention is not limited to the particular products nor reaction conditions mentioned therein.

Example 26.4 parts of 4-aminodiphenylamine-2-sulfonic acid, 18.5 parts of 4-chloro-3-nitrobenzonitrile and 11 parts of sodium carbonate are mixed with about 150 parts of water and about 50 parts of alcohol and the mixture is heated to boiling for some hours in an apparatus provided with a reflux condenser. Then the solution is filtered and the dyestuff formed of the formula:

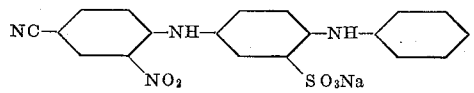

is precipitated from the filtrate by the addition of sodium chloride.

The new dyestuff dyes wool from an acid bath yellowish brown shades of good levelling power and excellent fastness to light.

The same product is obtained by employing instead of 4-chloro-3-nitrobenzonitrile the corresponding amount of 4-methoxy-3-nitrobenzonitrile in the above example.

Similar dyestuffs of the same good properties are obtained by employing instead of 4-aminodiphenylamine-2-sulfonic acid the corresponding amounts of 4'-methoxy-, 2'-methoxy-, 4'-aethoxy- or 4'-acetylamino-4-aminodiphenylamine-2-sulfonic acid or the like. Furthermore the said substitution products of the 4-aminodiphenylamine-2-sulfonic acid may be replaced by those of the 1-amino-4-cyclohexylaminobenzene-3-sulfonic acid, 1-amino-4-naphthylamino-benzene-3-sulfonic acid and the like, whereby dyestuffs of similar properties are obtained.

I claim:

1. The acid wool dyestuffs of the general formula:

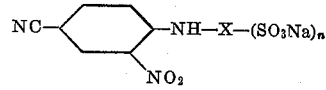

wherein $n$ stands for the number 1 or 2 and X stands for a member selected from the group consisting of aryl-NH-aryl and cycloalkyl-NH-aryl, aryl meaning a radicle selected from the group consisting of the benzene and naphthalene series, which dyestuffs dye animal fibers various shades of very good levelling power and excellent fastness to light.

2. The dyestuff of the formula:

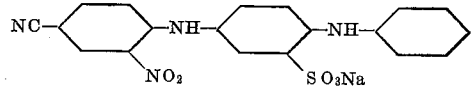

which dyestuff dyes wool from an acid bath yellowish brown shades of good levelling power and excellent fastness to light.

HEINRICH RITTER.